W. L. NESTLER.
GUARD FOR GAS JETS.
APPLICATION FILED JULY 31, 1916.
1,250,627.
Patented Dec. 18, 1917.
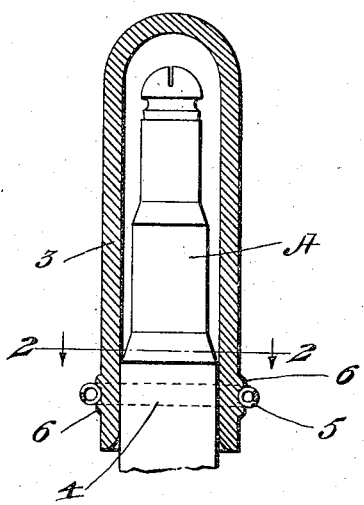
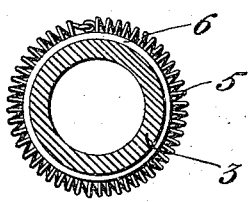
WITNESSES
INVENTOR
William L. Nestler
BY
ATTORNEY

UNITED STATES PATENT OFFICE.

WILLIAM L. NESTLER, OF POUGHKEEPSIE, NEW YORK.

GUARD FOR GAS-JETS.

1,250,627.     Specification of Letters Patent.     Patented Dec. 18, 1917.

Application filed July 31, 1916. Serial No. 112,362.

*To all whom it may concern:*

Be it known that I, WILLIAM L. NESTLER, a citizen of the United States, residing at Poughkeepsie, in the county of Dutchess and State of New York, have invented certain new and useful Improvements in Guards for Gas-Jets, of which the following is a specification.

My invention relates to a guard or safety cover for gas jets to prevent the issuance of gas into the room in the event the controlling valve or cock of the fixture is accidentally opened or is opened by children, so as to overcome the danger of inhalation of the gas by the occupants of the room and which oftentimes results in asphyxiation.

I particularly aim to provide a structure to accomplish the end stated which is capable of manufacture at very low cost and which at the same time time will form a gas-tight connection with the gas jet and to provide a spring to assist in the production of said connection and which by reason of its resiliency may be disposed between two annular ribs provided on the exterior of the guard.

Additional objects will appear as the description progresses in connection with accompanying drawings illustrating one preferred embodiment, wherein:—

Figure 1 is a view showing a gas jet and my improved guard in connection therewith but in vertical section, and Fig. 2 is a cross sectional view through the entire guard taken on the line 2—2 of Fig. 1 but omitting the gas jet.

Referring specifically to the drawings, wherein like reference characters designate like or similar parts, a gas jet has been shown at A to facilitate an explanation of the construction and operation of my improvements. I employ an elongated guard 3 in the form of a tube open at one end and closed at the other. This guard is preferably made of rubber so as to frictionally grip the exterior of the portion 4 of the gas jet and form a gas-tight connection thereat. This connection is readily formed, since the rubber will frictionally engage the exterior of the portion 4 and in addition the bore of the tube or guard may be slightly less than the diameter of the portion 4 so that the guard at the insert ends will be dilated to assist in the production of said connection.

In this construction, if the valve controlling the outflow of gas through the jet is accidentally opened, or opened by children, as in play, the gas cannot escape and cause injury since the guard effectively prevents escape.

To assist in the formation of the gas-tight joint, I surround the guard adjacent its base with a spring 5 which is tensioned to tightly surround the guard. This spring may be made in a single strand of wire and into a suitable number of coils and be substantially in ring form as shown. To prevent longitudinal displacement of the spring, I preferably provide two outwardly extending spaced annular ribs or rings on the exterior of the guard 3 at 6. A groove is provided intermediate the ribs in which the spring 5 is disposed. Since the spring 5 is yieldable, it may be readily expanded or dilated in order to clip into the recess intermediate the rib 6. As well, when the guard is applied to the gas jet, the spring 5 will be slightly dilated at the base of the guard and as a result, the spring 5 will be tensioned so as to better assist the guard in forming a gas tight connection at the portion 4 of the jet.

Since merely the preferred embodiment of the invention has been illustrated and described, it is to be understood that changes in the details of construction may be made within the spirit and scope of the invention.

I claim:—

1. A guard for a gas outlet having an external groove, and a spring resilient to facilitate mounting in said groove and as well to assist in providing a gas-tight connection with a gas outlet.

2. A guard for a gas outlet having a grip portion of rubber, a plurality of ribs integral with the guard on the exterior of the grip portion spaced from each other, and a spring, the resiliency of said spring enabling passage thereof past one of the ribs for disposition intermediate both ribs, and also assisting in forming a gas-tight connection with a gas outlet.

In testimony whereof I affix my signature in presence of two witnesses.

WILLIAM L. NESTLER.

Witnesses:
PHILIP MATHERN,
J. FRED ARNOLD.

Copies of this patent may be obtained for five cents each, by addressing the "Commissioner of Patents, Washington, D. C."